United States Patent
DeLuca et al.

(10) Patent No.: US 12,481,896 B2
(45) Date of Patent: Nov. 25, 2025

(54) UTILIZING VEHICLE SENSORS AND MACHINE LEARNING TRAINING TO TARGET CONFIDENT RESPONSES TO USER QUERIES

(71) Applicant: INTERNATIONAL BUSINESS MACHINES CORPORATION, Armonk, NY (US)

(72) Inventors: Lisa Seacat DeLuca, Baltimore, MD (US); Ronald Felice, Summerville, SC (US)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 16/689,198

(22) Filed: Nov. 20, 2019

(65) Prior Publication Data

US 2021/0150386 A1    May 20, 2021

(51) Int. Cl.
*G06F 7/00*    (2006.01)
*G06F 16/2457*    (2019.01)
(Continued)

(52) U.S. Cl.
CPC ......... *G06N 5/04* (2013.01); *G06F 16/24575* (2019.01); *G06F 16/24578* (2019.01);
(Continued)

(58) Field of Classification Search
CPC .... G06N 5/04; G06N 20/00; G06F 16/24575; G06F 16/24578; G06F 16/248; G06F 16/252
(Continued)

(56) References Cited

U.S. PATENT DOCUMENTS 9,672,497 B1   6/2017  Lewis
2003/0009270 A1*  1/2003  Breed ............... B60N 2/0276
                                                  701/32.4
(Continued)

FOREIGN PATENT DOCUMENTS

WO   2013072926 A2   2/2014
WO   2014098725 A1   6/2014

OTHER PUBLICATIONS

Kennedy, "IBM and Cisco to bring IoT to Remote Locations Like Oil Rigs", https://www.siliconrepublic.com/machines/ibm-cisco-watson-analytics-iot-data-oil., Silicone Republic, Jun. 3, 2016, pp. 1-22.
(Continued)

*Primary Examiner* — Pavan Mamillapalli
(74) *Attorney, Agent, or Firm* — Michael O'Keefe (57) ABSTRACT

A computer-implemented method for a query response system that provides targeted query response results related to a vehicle. The computer-implemented method receives a query from a user related to the vehicle. The computer-implemented method further determines a current status of one or more vehicle systems and one or more subsystems via a plurality of sensors associated with the vehicle. The computer-implemented method further links the received query together with the determined current status of the one or more vehicle systems and the one or more subsystems, and provides targeted query response results based on the linking. The computer-implemented method further includes training a machine learning system on digital twin content for the vehicle, wherein the trained machine learning system for the digital twin content is shared with the query response system.

20 Claims, 5 Drawing Sheets

(51) Int. Cl.
*G06F 16/248* (2019.01)
*G06F 16/25* (2019.01)
*G06F 17/00* (2019.01)
*G06N 5/04* (2023.01)
*G06N 20/00* (2019.01)

(52) U.S. Cl.
CPC .......... *G06F 16/248* (2019.01); *G06F 16/252* (2019.01); *G06N 20/00* (2019.01)

(58) Field of Classification Search
USPC .......................................................... 706/50
See application file for complete search history.

(56) References Cited

U.S. PATENT DOCUMENTS

| | | | | |
|---|---|---|---|---|
| 2005/0125117 | A1* | 6/2005 | Breed | G07C 5/0808 701/31.5 |
| 2007/0005202 | A1* | 1/2007 | Breed | G07C 5/008 714/25 |
| 2007/0005609 | A1* | 1/2007 | Breed | G01S 17/86 |
| 2007/0192173 | A1* | 8/2007 | Moughler | G06Q 10/06 705/7.42 |
| 2009/0096599 | A1* | 4/2009 | Kranz | G08G 1/02 340/459 |
| 2010/0217638 | A1* | 8/2010 | Dickson | G06Q 10/08 705/28 |
| 2014/0019522 | A1* | 1/2014 | Weng | G06N 5/02 709/203 |
| 2014/0136187 | A1 | 5/2014 | Wolverton | |
| 2017/0108834 | A1* | 4/2017 | Wang | G05B 11/01 |
| 2017/0169625 | A1 | 6/2017 | Lavie | |
| 2017/0313332 | A1* | 11/2017 | Paget | B61L 15/0072 |
| 2018/0257683 | A1* | 9/2018 | Govindappa | B61L 27/57 |
| 2018/0284758 | A1* | 10/2018 | Cella | G05B 23/0264 |
| 2019/0005195 | A1* | 1/2019 | Peterson | G16H 10/60 |
| 2019/0138970 | A1* | 5/2019 | Deutsch | G06F 9/542 |
| 2019/0225245 | A1* | 7/2019 | Kulkarni | B60W 50/0098 |
| 2019/0287079 | A1* | 9/2019 | Shiraishi | G07C 5/0841 |
| 2019/0324439 | A1* | 10/2019 | Cella | G05B 23/0294 |
| 2019/0324444 | A1* | 10/2019 | Cella | G06N 3/088 |
| 2020/0216089 | A1* | 7/2020 | Garcia | G06F 16/90332 |

OTHER PUBLICATIONS

Mell et al., "The NIST Definition of Cloud Computing", National Institute of Standards and Technology, Special Publication 800-145, Sep. 2011, 7 pages.

Youtube, "70 Miles From Shore with Watson: Woodside Energy and IBM", https://www.youtube.com/watch?v=GFZ2laTVKY8, Aug. 22, 2016, pp. 1-2.

Youtube, "IBM Distinguished Engineer Lisa Seacat DeLuca discusses Harman's Digital Cockpit at IBM Think 2018," Harman, https://www.youtube.com/watch?v=QpmbdBgGga0, Mar. 26, 2018, pp. 1-2.

* cited by examiner

UTILIZING VEHICLE SENSORS AND MACHINE LEARNING TRAINING TO TARGET CONFIDENT RESPONSES TO USER QUERIES

BACKGROUND

The present disclosure relates generally to the field of cognitive computing and more particularly to data processing, internet of things (IoT) sensors, and machine learning to target confident responses to user queries.

Nowadays, vehicles are equipped with sensors that monitor a variety of specific variables such as engine performance, fuel economy, tire pressure, outside air temperature, and even weather conditions. Typically, vehicles are built to provide an alert to a user, in the form of a dashboard light for example, when service is required or there is a problem with the vehicle (e.g., oil or fuel levels are low, check engine, etc.).

However, when a dashboard light comes up, such as the "check engine" light, the user is left in the dark with what that may mean. More often than not, the user must schedule an appointment with their vehicle repair service in order to find out what the problem is.

SUMMARY

Embodiments of the present invention disclose a method, a computer program product, and a system.

A method, according to an embodiment of the invention, in a data processing system including a processor and a memory, for a query response system that provides targeted query response results related to a vehicle. The method includes receiving a query from a user related to the vehicle. The method further includes determining a current status of one or more vehicle systems and one or more subsystems via a plurality of sensors associated with the vehicle. The method further includes linking the received query together with the determined current status of the one or more vehicle systems and the one or more subsystems. The method further includes providing targeted query response results based on the linking.

A computer program product, according to an embodiment of the invention, includes a non-transitory tangible storage device having program code embodied therewith. The program code is executable by a processor of a computer to perform a method. The method includes receiving a query from a user related to the vehicle. The method further includes determining a current status of one or more vehicle systems and one or more subsystems via a plurality of sensors associated with the vehicle. The method further includes linking the received query together with the determined current status of the one or more vehicle systems and the one or more subsystems. The method further includes providing targeted query response results based on the linking.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes receiving a query from a user related to the vehicle. The method further includes determining a current status of one or more vehicle systems and one or more subsystems via a plurality of sensors associated with the vehicle. The method further includes linking the received query together with the determined current status of the one or more vehicle systems and the one or more subsystems. The method further includes providing targeted query response results based on the linking.

DETAILED DESCRIPTION

As stated earlier, vehicles nowadays are equipped with sensors that monitor a variety of specific variables such as engine performance, fuel economy, tire pressure, outside air temperature, and even weather conditions. Typically, vehicles are built to provide an alert to a user, in the form of a dashboard light for example, when service is required or there is an issue with the vehicle (e.g., oil or fuel levels are low, check engine, etc.).

However, when a dashboard light comes up, such as the "check engine" light, the user is left in the dark with what that may mean.

IBM Watson® Personal Assistant (Watson and all Watson-based trademarks and logos are trademarks or registered trademarks of International Business Machines Corporation and/or its affiliates) is a smart assistant with a conversational interface that may be embedded in, or integrated into, any "thing", such as vehicles, and uses artificial intelligence (AI) to determine when to search for an answer in a knowledge base, when to ask for clarity, and when to direct a user to a human interface. In various embodiments, IBM Watson® Personal Assistant may be accessed via voice or text interaction and gets to know a person more through each and every interaction.

In the present invention, the knowledge base being searched, in response to a user query, may include vehicle owner manuals and service manuals pertaining to the specific user vehicle. The vehicle owner manuals and service manuals are ingested by the IBM Watson® Personal Assistant to train a machine learning system on the available content within the manuals. This information may then be shared with the voice capabilities of IBM Watson® Personal Assistant to provide for confident and targeted responses to user queries regarding their vehicle.

For example, a user may ask a simple question such as "where is the hood release lever?" and receive a response from IBM Watson® Personal Assistant describing the location of the hood release lever, based on the information provided in the vehicle owner manual.

Additionally, the telematics, onboard sensors, and diagnostic algorithms of a vehicle provide additional contextual information such as which error codes (i.e., diagnostic trouble codes), sensors, and lights are currently triggered. Error codes are codes that the vehicle's on-board diagnostics (OBD) system uses to notify a user about a problem. Each code corresponds to a fault detected in the vehicle. When the vehicle detects a problem, the OBD will activate the corresponding error code. Typically, a vehicle stores the error code in the vehicle's memory when the OBD detects a component or system that is not operating within acceptable limits. The error code will help a user identify and fix the problem within the vehicle.

A problem in the art of sensor monitoring systems of a vehicle is the ability to convey targeted responses to a user, in response to a query, that identify the one or more problems associated with the vehicle.

The present invention discloses a method that dynamically receives a user query related to the vehicle, determines a current status of the one or more vehicle systems via a plurality of sensors within the vehicle, links the query with the determined current status of the one or more vehicle systems, and provides targeted response results addressing the user's query.

By obtaining a snapshot of all vehicle sensor systems in a vehicle at the time a user query is received, the present invention is able to identify a possible vehicle problem with a certain degree of confidence, and further increase the confidence level based on the trained machine learning system and user feedback.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
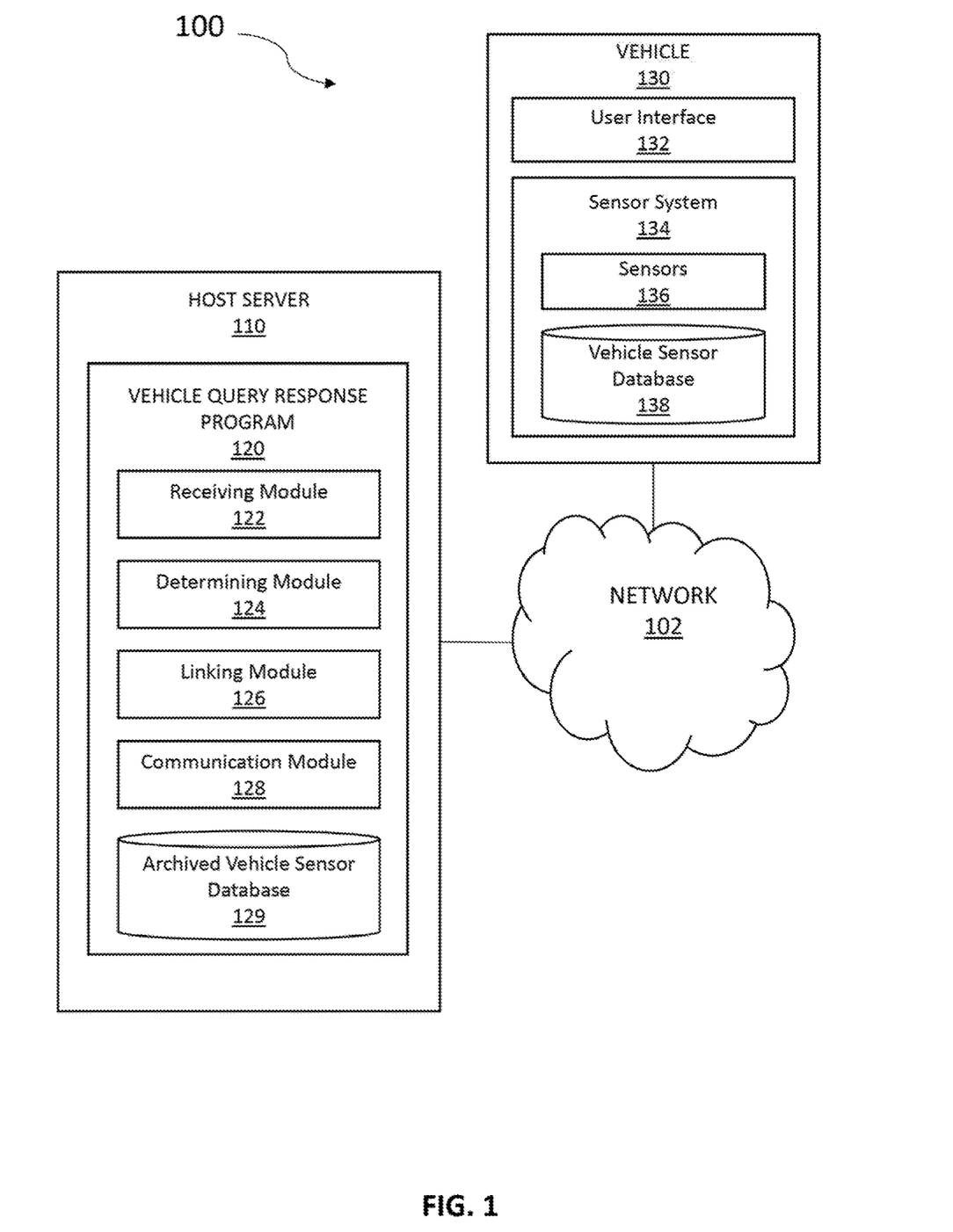
FIG. 1 illustrates a vehicle query response computing environment, in accordance with an embodiment of the present invention.

FIG. 1 illustrates vehicle query response computing environment 100, in accordance with an embodiment of the present invention. Vehicle query response computing environment 100 includes host server 110 and vehicle 130, connected via network 102. The setup in FIG. 1 represents an example embodiment configuration for the present invention, and is not limited to the depicted setup in order to derive benefit from the present invention.

In exemplary embodiments, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between host server 110 and vehicle 130.

In an exemplary embodiment, host server 110 contains vehicle query response program 120. In various embodiments, host server 110 may be a laptop computer, tablet computer, netbook computer, personal computer (PC), a desktop computer, a personal digital assistant (PDA), a smart phone, a server, or any programmable electronic device capable of communicating with vehicle 130 via network 102. Host server 110 may include internal and external hardware components, as depicted and described in further detail below with reference to FIG. 3. In other embodiments, host server 110 may be implemented in a cloud computing environment, as described in relation to FIGS. 4 and 5, herein. Host server 110 may also have wireless connectivity capabilities allowing the host server 110 to communicate with vehicle 130 and other computers or servers over network 102.

With continued reference to FIG. 1, vehicle 130 contains user interface 132, sensor system 134, and vehicle sensor database 138. In exemplary embodiments, vehicle 130 may be a car, a minivan, a truck, a tractor-trailer, a train, or any road vehicle containing one or more sensor systems 134. In alternative embodiments, vehicle 130 may be any vehicle containing one or more sensor systems, such as a vehicle that flies in the sky (e.g. airplane, rocket ship, hot-air balloon, hovercraft, etc.), a vehicle that floats on the water (e.g. motorboat, yacht, jet ski, pontoon, freight ship, etc.), and any other vehicle known to one of ordinary skill in the art.

While the present invention focuses primarily on problem detection for vehicle sensor monitoring, in relation to a user query, the present invention is not limited to the defined scope, or category, of vehicles. For example, the present invention may be used for any electronic device, gadget, or defined space containing one or more sensor systems, such as houses, greenhouses, schools, museums, warehouses, construction and agricultural machinery, hydraulics, and so forth.

In an exemplary embodiment, vehicle 130 includes user interface 132, which may be a computer program that allows a user to interact with vehicle 130 and other connected devices via network 102. For example, user interface 132 may be a graphical user interface (GUI). In addition to comprising a computer program, user interface 132 may be connectively coupled to hardware components, such as those depicted in FIG. 3, for sending and receiving data. In an exemplary embodiment, user interface 132 may be a web browser, however in other embodiments user interface 132 may be a different program capable of receiving user interaction and communicating with other devices, such as host server 110.

In exemplary embodiments, user interface 132 may be a touch screen display, a remote operated display, or a display that receives input form a physical keyboard or touchpad located within vehicle 130, such as on the dashboard, console, etc. In alternative embodiments, user interface 132 may be operated via voice commands, Bluetooth® (Bluetooth and all Bluetooth-based trademarks and logos are trademarks or registered trademarks of Bluetooth SIG, Inc. and/or its affiliates), a mobile device that connects to vehicle 130, or by any other means known to one of ordinary skill in the art. In exemplary embodiments, a user may interact with user interface 132 to report a problem with vehicle 130. In various embodiments, a user may interact with user interface 132 to provide feedback to vehicle diagnostic query program 120, via network 102.

In an exemplary embodiment, user interface 132 may include a voice interface such as IBM Watson® Personal Assistant, thus allowing vehicle diagnostic query program 120 to communicate with vehicle 130 and obtain specific vehicle car manual data, service history data, user queries, authorizations, access to user information, personalized responses from an associated user, snapshots of vehicle sensor system data, and so forth.

In an exemplary embodiment, vehicle 130 includes a sensor system 134, which comprises one or more sensors 136. A sensor 136 is a device, module, or subsystem whose purpose is to detect events or changes in its environment and transmit the data to other electronics, such as host server 110. For example, one or more sensors 136 within vehicle 130, when taken together, may comprise a sensor system 134 such as an engine sensor system, an electrical sensor system, a fuel sensor system, an emissions sensor system, a camera sensor system, a temperature sensor system, or any other compilation of sensors 136 within vehicle 130 that, when taken together, comprise a sensor system 134. Typically, a sensor system 134 monitors specific, pre-defined conditions and works independently of other sensor systems 134 within an environment. Throughout this disclosure, "sensor system" may be used interchangeably with "vehicle system".

In exemplary embodiments, a sensor system 134, via the one or more sensors 136 that make up the sensor system 134, may be capable of providing a snapshot, or an overall status of the functioning of the sensor system 134 at a given moment in time. For example, sensor system 134 may be capable of reporting any malfunctioning sensors 136 or an increase/decrease in the sensor system 134 functionality, taken as a whole, at a given moment in time, over a pre-defined timeframe, or when a problem or malfunction is detected with vehicle 130. For example, a broken taillight may affect existing sensors 136 that monitor vehicle's 130 electrical system. In other embodiments, a loose body panel on vehicle 130 may be detected via vehicle diagnostic query program 120 based on a decrease in overall fuel efficiency of vehicle 130. Snapshots of multiple sensor systems 134, at a given moment in time, may provide an overall picture of the interaction of multiple sensor systems 134 in vehicle 130.

In various embodiments, sensors 136 are embedded within various sensor systems 134 in vehicle 130 that contain a computer processing unit (CPU), memory, and power resource, and may be capable of communicating with vehicle 130 and host server 110 over network 102.

In exemplary embodiments, sensors 136 are capable of continuously monitoring, collecting, and saving collected data from a sensor system 134 on a local storage, such as vehicle sensor database 138, or sending the collected data to vehicle query response program 120 for analysis. In alternative embodiments, sensors 136 may be capable of detecting, communicating, pairing, or syncing with internet of things (IoT) devices, thus creating opportunities for more direct integration of the physical world into computer-based systems, and resulting in improved efficiency, accuracy, and economic benefit in addition to reduced human intervention.

In addition to correlating one or more sensors 136 with a problem event, the present invention also correlates data received from one or more sensors 136 of vehicle 130 with other sensors 136 of vehicle 130. For example, a collection of sensors 136, across various sensor systems 134, may be capable of simulating a failed, or non-functioning, sensor 136.

In exemplary embodiments, vehicle sensor database 138 may be local data storage on sensor system 134 that contains one or more sets of vehicle sensor data that correspond to one or more sensor systems 134 of vehicle 130. For example, one or more sets of vehicle sensor data may include collected data, via sensors 136 for a particular sensor system 134, on a particular day, time, location, and so forth.

In alternative embodiments, vehicle sensor database 138 may store the collected data according to snapshots of a particular sensor system 134 (e.g., electrical system, fuel efficiency system, etc.), or all sensor systems 134, based on a detected problem associated with a sensor system 134 at a given moment in time, or over a pre-configured time period.

While vehicle sensor database 138 is depicted as being stored on sensor system 134, in other embodiments, vehicle sensor database 138 may be stored on host server 110, vehicle diagnostic query program 120, or any other device or database connected via network 102, as a separate database. In alternative embodiments, vehicle sensor database 138 may be comprised of a cluster or plurality of computing devices, working together or working separately.

With continued reference to FIG. 1, vehicle query response program 120, in an exemplary embodiment, may be a computer application on host server 110 that contains instruction sets, executable by a processor. The instruction sets may be described using a set of functional modules. In exemplary embodiments, vehicle diagnostic query program 120 may receive a query from a user in vehicle 130, together with vehicle sensor data, over network 102. In alternative embodiments, vehicle query response program 120 may be a computer application contained within vehicle 130, or as a standalone program on a separate electronic device.

With continued reference to FIG. 1, the functional modules of vehicle query response program 120 include receiving module 122, determining module 124, linking module 126, communication module 128, and archived vehicle sensor database 129.

Figure 2:
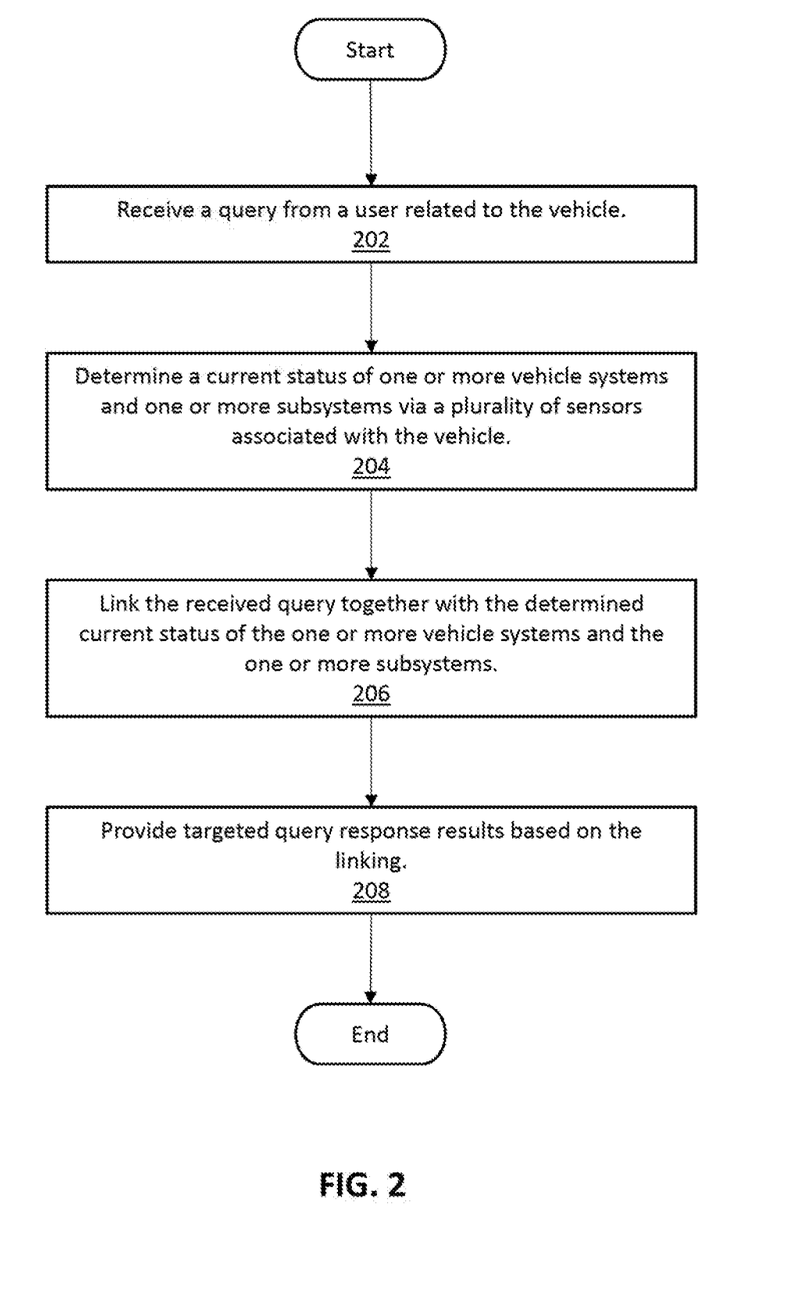
FIG. 2 is a flowchart illustrating the operation of vehicle query response program of FIG. 1, in accordance with an embodiment of the present invention.

FIG. 2 is a flowchart illustrating the operation of vehicle query response program 120 of FIG. 1, in accordance with embodiments of the present invention.

In exemplary embodiments, vehicle query response program 120 is initially trained on digital twin content prior to receiving any queries from a user.

In exemplary embodiments, vehicle query response program 120 trains a machine learning system on digital twin content for vehicle 130, wherein the trained machine learning system for the digital twin content is shared with the query response system associated with vehicle 130. In further embodiments, vehicle query response program 120 may also be trained on user vehicle manuals, repair and service manuals for vehicle 130, service history for vehicle 130 (e.g., tune ups, oil changes, tire rotations, repairs, etc.), and any other data that is relevant to the proper use and functioning of vehicle 130.

In exemplary embodiments, the digital twin content comprises at least one of: a user manual, an operating manual, fault codes, a bill of materials, parts list, engineering manuals, computer aided design (CAD) files, maintenance manuals, maintenance plans, operating models, remote procedures, forecast models, and service manuals.

In exemplary embodiments, the user manual (e.g., instruction manual or user guide), is an instructional book or booklet that is supplied with vehicle 130 which may include, but is not limited to, three main areas of specification: a description of the location and operation of all controls of vehicle 130; a schedule and description of maintenance required for vehicle 130, both by the owner and the mechanic; and specifications such as oil and fuel capacity and part numbers of light bulbs used.

With reference to FIGS. 1 and 2, receiving module 122 includes a set of programming instructions in vehicle query response program 120, to receive a query from a user related to vehicle 130 (step 202). For example, receiving module 122 utilizes natural language processing techniques (e.g., parts of speech (POS) tagging, named entity recognition, machine translation, tokenization, feature extraction, entity extraction, etc.) to breakdown a received query from a user and match it with digested digital twin content on its machine learning system.

In exemplary embodiments, receiving module 122 receives a query from the user in at least one of the following ways: via a voice interface within vehicle 130, via a mobile application on a device of the user, via a phone call with a remote assistant, and via a text input.

In exemplary embodiments, vehicle query response program 120 may further include a mechanism for enabling off-board communication of vehicle 130, sensor data, and contextual data either within the vehicle IoT network or externally connected to the vehicle IoT network, thereby allowing for access to one or more error codes associated with vehicle 130 that are not contained within the trained machine learning system.

With reference to an illustrative example, Bob is driving in his car and the "check engine" light suddenly comes on within the dashboard. Bob asks IBM Watson® Personal Assistant, which is installed in his car, "Watson, what does that 'check engine' light that just came on mean?" Without the present invention, Bob would need to read through his owner's manual to determine possible reasons for the "check engine" light, or bring his car to a service station. The present invention, rather, is capable of understanding Bob's inquiry (via natural language processing techniques, as discussed above) and analyzing the sensor systems 134 within Bob's car in order to pointedly respond to Bob's question.

With continued reference to FIGS. 1 and 2, determining module 124 includes a set of programming instructions in vehicle query response program 120, to determine a current status of one or more vehicle systems and one or more subsystems via a plurality of sensors 136 associated with vehicle 130 (step 204). The set of programming instructions is executable by a processor.

For example, determining module 124 may be capable of determining if one or more sensor systems 134 are "on" or "off"; diagnostic readings (e.g., amount of gas remaining in the gas tank, tire pressure for each tire, number of miles remaining until gas tank is empty, oil level, and so forth); and any other error codes that may be associated with the proper/improper functioning of vehicle 130.

In exemplary embodiments, current and historic error codes may be read from the vehicle bus, by either an electronic control unit (ECU) within the vehicle network, or via an external application paired with an On-Board Diagnostics dongle. For example, determining module 124 may request the one or more error codes from the ECU that is responsible for maintaining the one or more error codes (e.g., a specific sensor system 134). Furthermore, determining module 124 may request snapshot data, from the ECU that is responsible for capturing and storing the requested snapshot data, at the time the error code occurred.

In various embodiments, the vehicle sensor data, together with determined error codes of vehicle 130, may be stored in archived vehicle sensor database 129 and used as comparative data for sensor data received in the future.

In exemplary embodiments, archived vehicle sensor database 129 is local data storage on vehicle diagnostic query program 120 that may contain a list of one or more problems, events, or error codes associated with corresponding sensor systems 134 of vehicle 130. In exemplary embodiments, the sets of archived data in archived vehicle sensor database 129 may be organized into datasets according to user, vehicle identification, sensor system, problem history, user query, and optionally, user feedback confirming the problem. In exemplary embodiments, user feedback may be received (e.g., a "yes" or "no" response by the user) by vehicle query response program 120 after prompting a user for confirmation that the query response accurately responded to the user query. For example, a data set may be stored as <userA, VIN #1234, electrical, broken_taillight, why_signal_nonfunction, yes> or <userB, VIN #5678, fuel, leak, why_low_fuel, no>.

In alternative embodiments, archived vehicle sensor database 129 may be organized according to a snapshot of all sensor systems 134 for vehicle 130 at a given moment in time, together with a confidence level associated with the received snapshot of vehicle sensor data for all sensor systems 134, which may include user feedback confirming a detected problem, or variation of performance of one or more sensor systems 134. Over time, various vehicle problems, or events, may become more closely associated with the discovered variation of performance of one or more sensor systems 134, thus increasing the confidence levels of vehicle query response program's 120 assessment of received snapshots of vehicle sensor data.

While archived vehicle sensor database 129 is depicted as being stored on vehicle query response program 120, in other embodiments, archived vehicle sensor database 129 may be stored on host server 110, vehicle 130, or any other device or database connected via network 102, as a separate database. In alternative embodiments, archived vehicle sensor database 129 may be comprised of a cluster or plurality of computing devices, working together or working separately.

With continued reference to the illustrative example above, determining module 124 determines which, if any, sensor systems 134 within Bob's car are experiencing error codes. Information about the existence of error codes currently going off in Bob's car, as well as diagnostic sensor information (e.g., fuel level, oil level, tire pressure, etc.), are transmitted together with Bob's query ("Watson, what does that 'check engine' light that just came on mean?") to linking module 126.

With continued reference to FIGS. 1 and 2, linking module 126 includes a set of programming instructions in vehicle query response program 120, to link the received query together with the determined current status of the one or more vehicle systems and the one or more subsystems (step 206). The set of programming instructions is executable by a processor.

In exemplary embodiments, linking module 126 is capable of transmitting the determined current status of the one or more vehicle systems and the one or more subsystems, together with the query from the user, to the trained machine learning system, and providing a context for the query based on the determined current status of the one or more vehicle systems and the one or more subsystems, via the plurality of sensors 136 within vehicle 130.

In exemplary embodiments, vehicle query response program 120 is capable of searching the vehicle owner's manual based on the user query, by using natural language processing techniques. By utilizing a snapshot of current sensor systems 134 within vehicle 130, vehicle query response program 120 is capable of providing a context for the user query and transmitting confident and targeted responses to the user.

With continued reference to FIGS. 1 and 2, communication module 128 includes a set of programming instructions in vehicle query response program 120, to provide targeted query response results based on the linking of the received user query together with the determined current status of the one or more vehicle systems and the one or more subsystems (step 206). The set of programming instructions is executable by a processor.

In exemplary embodiments, vehicle query response program 120 is capable of ranking the query response results based on a confidence level linking the received user query together with the determined current status of the one or more vehicle systems and the one or more subsystems, and displaying the ranked query response results based on the confidence level.

In exemplary embodiments, a higher confidence level is based on a higher number of matches of the user query with the trained digital twin content, together with the IoT sensor data serving as evidence for the existing contextual data of vehicle 130.

With continued reference to the illustrative example above, IBM Watson® Personal Assistant analyzes the determined error codes associated with Bob's car, together with Bob's specific question about the "check engine" light that appeared on his dashboard, and provides a response with high confidence that Bob's car's oil levels are dangerously low and that Bob needs to get an oil change. Bob gets an oil change and the "check engine" light goes off.

In exemplary embodiments, communication module 128 is capable of sharing the targeted query response results with the user via at least one of the following ways: verbally sharing over a sound system associated with vehicle 130; visually displaying on user interface 132 associated with vehicle 130; and transmitting to a mobile application on a mobile device of the user.

In further exemplary embodiments, communication module 128 may be capable of sharing the determined current status of the one or more vehicle systems and the one or more subsystems of vehicle 130 (e.g., sensor and code payload data) with a service center, via a network connection (e.g., network 102) to the service center's server or computer. This information may serve as an initial set of data for a root cause analysis of the vehicle's 130 issue, thus accelerating vehicle repair time and minimizing a user's inconvenience time.

Figure 3:
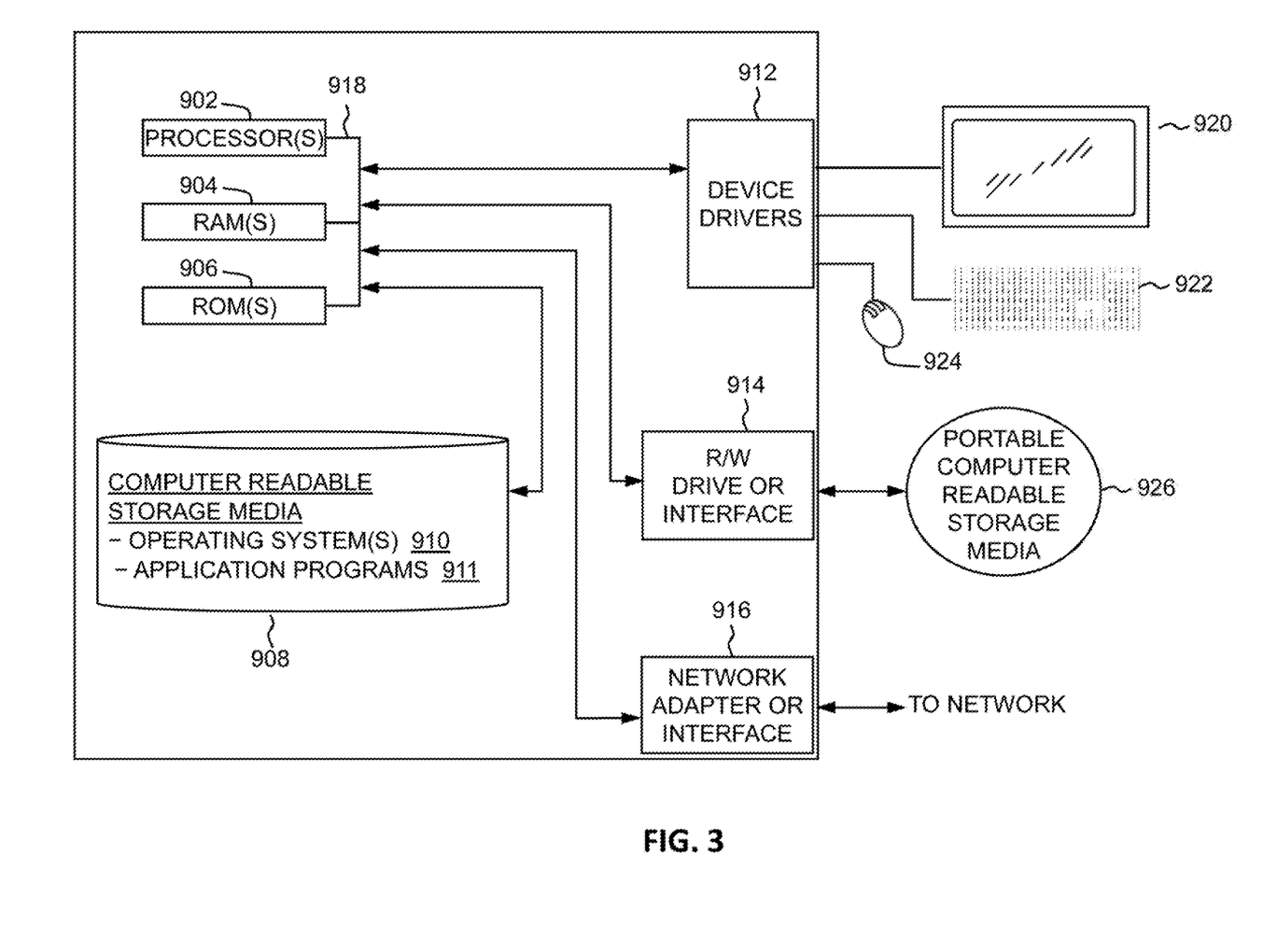
FIG. 3 is a diagram graphically illustrating the hardware components of vehicle query response computing environment of FIG. 1, in accordance with an embodiment of the present invention.

FIG. 3 is a block diagram depicting components of a computing device (such as host server 110, as shown in FIG. 1), in accordance with an embodiment of the present invention. It should be appreciated that FIG. 3 provides only an illustration of one implementation and does not imply any limitations with regard to the environments in which different embodiments may be implemented. Many modifications to the depicted environment may be made.

The computing device of FIG. 3 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as vehicle query response program 120, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device of FIG. 3 may also include a R/W drive or interface 914 to read from and write to one or more portable computer readable storage media 926. Application programs 911 on computing device of FIG. 3 may be stored on one or more of the portable computer readable storage media 926, read via the respective R/W drive or interface 914 and loaded into the respective computer readable storage media 908.

The computing device of FIG. 3 may include a network adapter or interface 916, such as a TCP/IP adapter card or wireless communication adapter (such as a 4G wireless communication adapter using OFDMA technology). Application programs 911 on computing device of FIG. 3 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

The computing device of FIG. 3 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
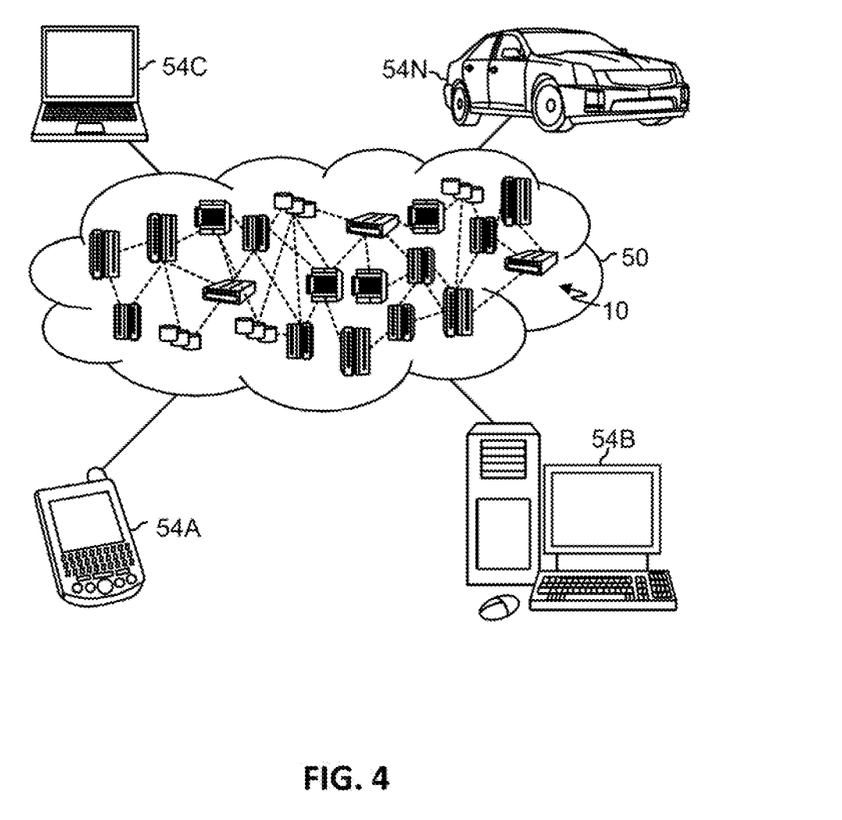
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
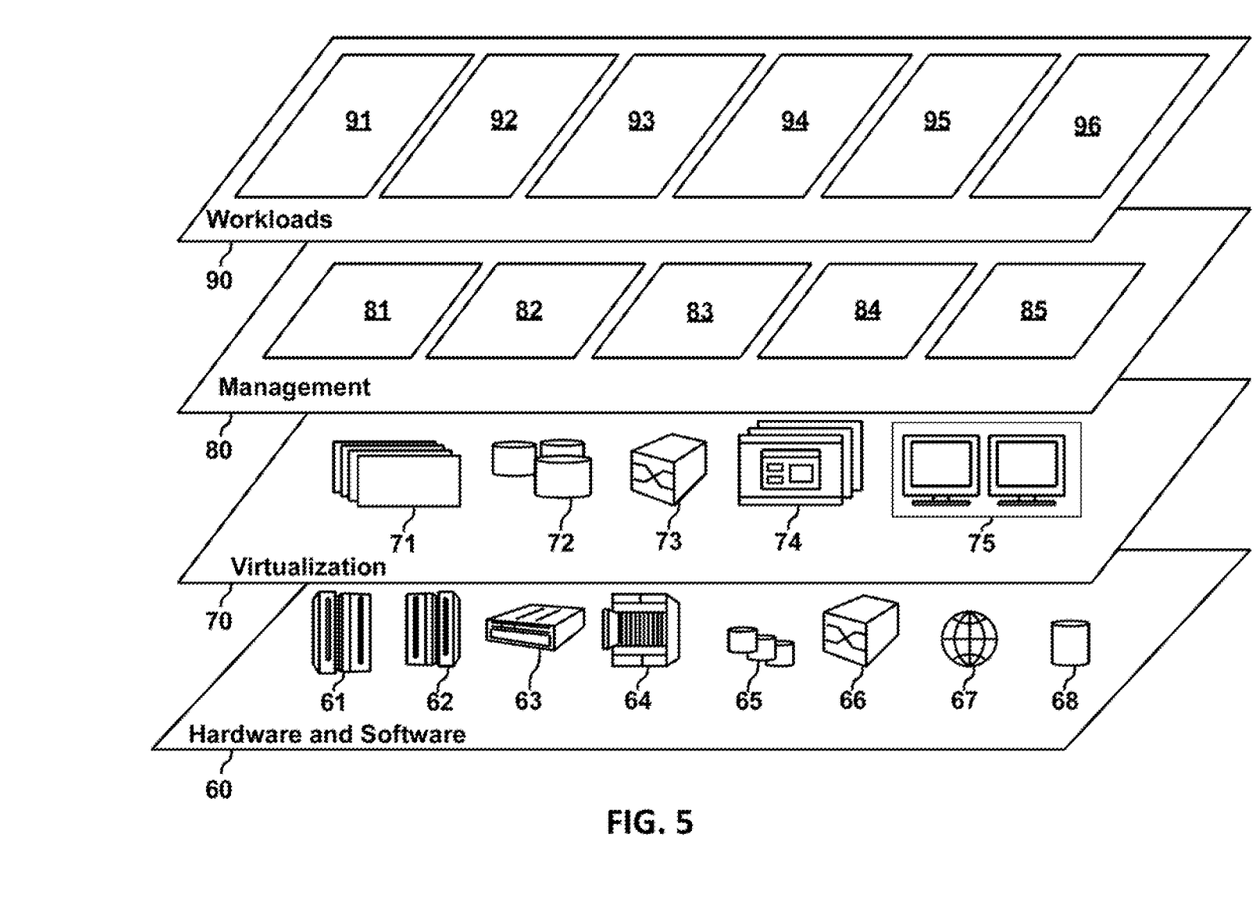
FIG. 5 depicts abstraction model layers of the illustrative cloud computing environment of FIG. 4, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A computer-implemented method for a query response system that provides targeted query response results related to a vehicle, comprising:
   receiving a query from a user related to the vehicle;
   determining a current status of one or more vehicle systems and one or more subsystems via a plurality of sensors associated with the vehicle;
   identifying a problem event based on the current status of the one or more vehicle systems and the one or more subsystems;
   training a machine learning system on digital twin content for the vehicle, wherein the trained machine learning system for the digital twin content is shared with the query response system;
   linking the received query together with the determined current status of the one or more vehicle systems and the one or more subsystems and the problem event; and
   providing targeted query response results based on the linking and the trained machine learning system.

2. The computer-implemented method of claim 1, wherein the digital twin content is selected from a group consisting of: a user manual, an operating manual, fault codes, a bill of materials, parts list, engineering manuals, computer aided design (CAD) files, maintenance manuals, maintenance plans, operating models, remote procedures, forecast models, and service manuals.

3. The computer-implemented method of claim 1, further comprising:
   transmitting the determined current status of the one or more vehicle systems and the one or more subsystems, together with the query from the user, to the trained machine learning system; and
   providing a context for the query based on the determined current status of the one or more vehicle systems and the one or more subsystems, via the plurality of sensors, associated with the vehicle.

4. The computer-implemented method of claim 1, further comprising:
   ranking the targeted query response results based on a confidence level linking the received query together with the determined current status of the one or more vehicle systems and the one or more subsystems; and
   displaying the ranked targeted query response results based on the confidence level.

5. The computer-implemented method of claim 1, wherein the received query from the user is selected from a group consisting of: via a voice interface within the vehicle, via a mobile application on a device of the user, via a phone call with a remote assistant, and via a text input.

6. The computer-implemented method of claim 1, wherein providing the targeted query response results further comprises:
   sharing the targeted query response results with the user via at least one of the following ways: verbally sharing over a sound system associated with the vehicle; visually displaying on a user interface associated with the vehicle; and transmitting to a mobile application on a mobile device of the user.

7. The computer-implemented method of claim 1, further comprising:
   sharing the determined current status of the one or more vehicle systems and the one or more subsystems of the vehicle with a service center.

8. A computer program product for a query response system that provides targeted diagnostic data about a vehicle, comprising a non-transitory tangible storage device having program code embodied therewith, the program code executable by a processor of a computer to perform a method, the method comprising:
   receiving a query from a user related to the vehicle;
   determining a current status of one or more vehicle systems and one or more subsystems via a plurality of sensors associated with the vehicle;
   identifying a problem event based on the current status of the one or more vehicle systems and the one or more subsystems;
   training a machine learning system on digital twin content for the vehicle, wherein the trained machine learning system for the digital twin content is shared with the query response system;
   linking the received query together with the determined current status of the one or more vehicle systems and the one or more subsystems and the problem event; and
   providing targeted query response results based on the linking and the trained machine learning system.

9. The computer program product of claim 8, wherein the digital twin content is further selected from a group consisting of: a user manual, an operating manual, fault codes, a bill of materials, parts list, engineering manuals, computer aided design (CAD) files, maintenance manuals, maintenance plans, operating models, remote procedures, forecast models, and service manuals.

10. The computer program product of claim 8, further comprising:
   transmitting the determined current status of the one or more vehicle systems and the one or more subsystems, together with the query from the user, to the trained machine learning system; and
   providing a context for the query based on the determined current status of the one or more vehicle systems and the one or more subsystems, via the plurality of sensors, associated with the vehicle.

11. The computer program product of claim 8, further comprising:
   ranking the targeted query response results based on a confidence level linking the received query together with the determined current status of the one or more vehicle systems and the one or more subsystems; and
   displaying the ranked targeted query response results based on the confidence level.

12. The computer program product of claim 8, wherein the received query from the user is selected from a group consisting of: via a voice interface within the vehicle, via a mobile application on a device of the user, via a phone call with a remote assistant, and via a text input.

13. The computer program product of claim 8, wherein providing the targeted query response results about the vehicle based on the linking, further comprises:

sharing the targeted query response results with the user via at least one of the following ways: verbally sharing over a sound system associated with the vehicle; visually displaying on a user interface associated with the vehicle; and transmitting to a mobile application on a mobile device of the user.

14. The computer program product of claim 8, further comprising:

sharing the determined current status of the one or more vehicle systems and the one or more subsystems of the vehicle with a service center.

15. A computer system for a query response system that provides targeted query response results related to a vehicle, comprising:

one or more computer devices each having one or more processors and one or more tangible storage devices; and a program embodied on at least one of the one or more storage devices, the program having a plurality of program instructions for execution by the one or more processors, the program instructions comprising instructions for:

receiving a query from a user related to the vehicle;

determining a current status of one or more vehicle systems and one or more subsystems via a plurality of sensors associated with the vehicle;

identifying a problem event based on the current status of the one or more vehicle systems and the one or more subsystems;

training a machine learning system on digital twin content for the vehicle, wherein the trained machine learning system for the digital twin content is shared with the query response system;

linking the received query together with the determined current status of the one or more vehicle systems and the one or more subsystems and the problem event; and providing targeted query response results based on the linking and the trained machine learning system.

16. The computer system of claim 15, further comprising:

transmitting the determined current status of the one or more vehicle systems and the one or more subsystems, together with the query from the user, to the trained machine learning system; and providing a context for the query based on the determined current status of the one or more vehicle systems and the one or more subsystems, via the plurality of sensors, associated with the vehicle.

17. The computer system of claim 15, further comprising:

ranking the targeted query response results based on a confidence level linking the received query together with the determined current status of the one or more vehicle systems and the one or more subsystems; and displaying the ranked targeted query response results based on the confidence level.

18. The computer system of claim 15, wherein the received query from the user is selected from a group consisting of: via a voice interface within the vehicle, via a mobile application on a device of the user, via a phone call with a remote assistant, and via a text input.

19. The computer system of claim 15, wherein providing the targeted query response results further comprises:

sharing the targeted query response results with the user via at least one of the following ways: verbally sharing over a sound system associated with the vehicle; visually displaying on a user interface associated with the vehicle; and transmitting to a mobile application on a mobile device of the user.

20. The computer system of claim 15, further comprising:

sharing the determined current status of the one or more vehicle systems and the one or more subsystems of the vehicle with a service center.

\* \* \* \* \*